US006628929B1

(12) United States Patent
Nomura

(10) Patent No.: US 6,628,929 B1
(45) Date of Patent: Sep. 30, 2003

(54) TRANSMISSION POWER CONTROL FOR USE IN A TRANSMITTING APPARATUS IN A CDMA COMMUNICATION SYSTEM

(75) Inventor: Tominari Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/335,889

(22) Filed: Jun. 18, 1999

(30) Foreign Application Priority Data

Jun. 18, 1998 (JP) ............................................ 10-170932

(51) Int. Cl.[7] .......................... H01Q 11/12; H04B 1/04
(52) U.S. Cl. ...................... 455/126; 455/522; 370/342; 375/146
(58) Field of Search .................................. 370/311, 320, 370/335, 342, 441; 455/69, 522, 126; 375/295, 296, 146

(56) References Cited

U.S. PATENT DOCUMENTS

| 5,105,445 A | * | 4/1992 | Karam et al. ................. 375/296 |
| 5,544,156 A | * | 8/1996 | Teder et al. .................. 370/342 |
| 5,737,327 A | | 4/1998 | Ling et al. ................... 370/335 |
| 6,034,952 A | * | 3/2000 | Dohi et al. ................... 370/335 |
| 6,353,604 B2 | * | 3/2002 | Grimwood et al. .......... 370/335 |
| 6,370,109 B1 | * | 4/2002 | Schwartz et al. ............. 370/335 |
| 6,404,760 B1 | * | 6/2002 | Holtzman et al. ............ 370/342 |

FOREIGN PATENT DOCUMENTS

| EP | 0 648 012 A1 | 4/1995 |
| JP | 7-235913 | 9/1995 |
| JP | 8-8877 | 1/1996 |
| JP | 9-284212 | 10/1997 |
| JP | 10-41919 | 2/1998 |
| JP | 10-41919 A | 2/1998 |

* cited by examiner

Primary Examiner—Nay Maung
Assistant Examiner—Philip J. Sobutka
(74) Attorney, Agent, or Firm—Sughrue Mion, PLLC

(57) ABSTRACT

In a transmission power control unit for use in a transmitting apparatus, power control amount correctors carry out, on the basis of detected signals, correction of power control amounts on transmission amplitude data to produce corrected data. A power control correction code generator generates a power control correction code. Spreading sections carry out spread processings on the corrected data using replaced spreading codes into which respective parts of spreading codes are replaced with the power control correction code. A multiplexer multiplexes spread data into a multiplexed amplitude datum. A D/A converter converts the multiplexed amplitude datum into an analog signal. A radio section carries out modulation, frequency conversion, and power amplification on the analog signal to produce a transmission signal. A distributor extracts a part from the transmission signal as an extracted signal. A frequency converter converts the extracted signal into a frequency-converted signal. A despreading section carries out a despread operation on the frequency-converted signal to detect transmission power for the respective channels. A timing controller generates a clock signal for synchronizing the despreading section and the spreading sections.

19 Claims, 10 Drawing Sheets

FIG.6A POWER CONTROL CORRECTION CODE

| 1 | 2 | ... | 14 | 15 | 1 | 2 | ... | 14 | 15 | 1 | 2 |

FIG.6B SPREADING CODE

| 1 | 2 | ... | 32766 | 32767 | 1 | 2 | ... | 32766 | 32767 | 1 | 2 |

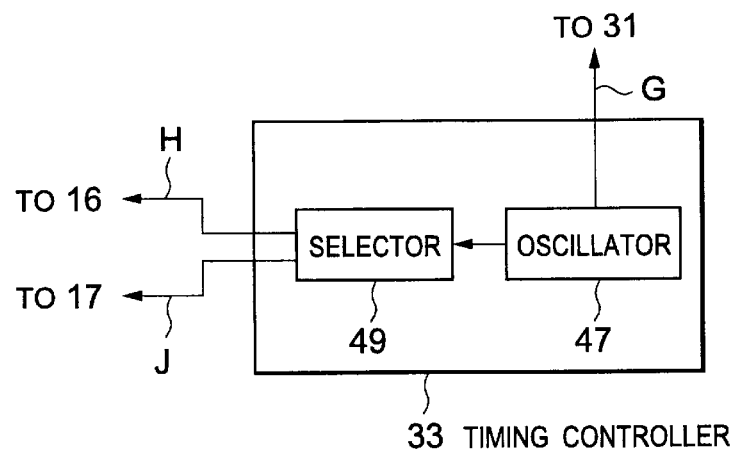
FIG.7
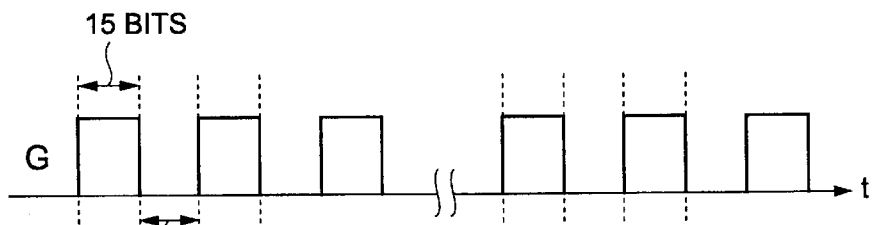
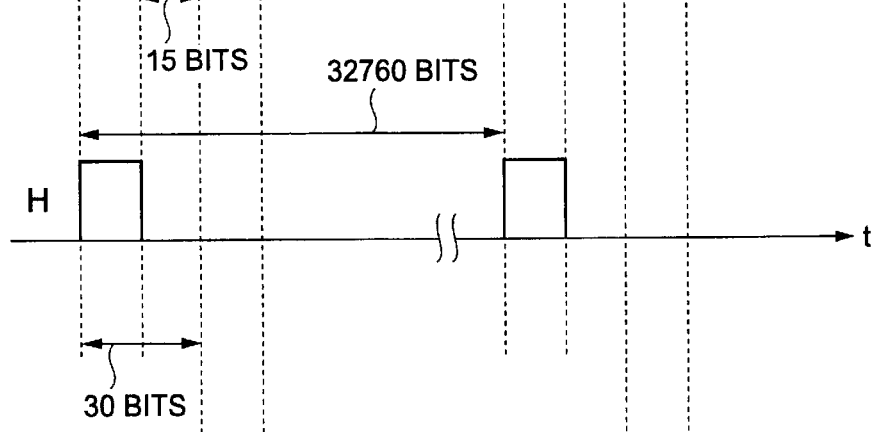
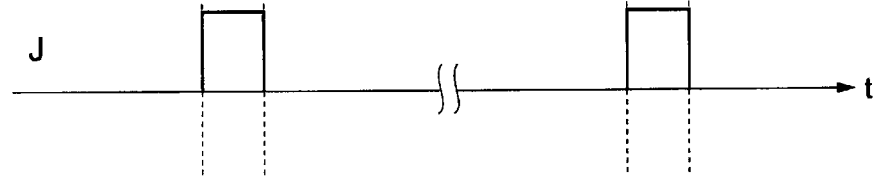

TRANSMISSION POWER CONTROL FOR USE IN A TRANSMITTING APPARATUS IN A CDMA COMMUNICATION SYSTEM

BACKGROUND OF THE INVENTION

This invention relates to a transmission power control unit, in particular, to a transmission power control unit for use in a transmitting apparatus for transmitting transmission data with the transmission data multiplexed, such as a radio base station apparatus for use in a code division multiple access (CDMA) communication system.

For example, in a cellular mobile communication system such as the code division multiple access (CDMA) communication system, a service area is divided into a plurality of units called cells in each of which a radio base station apparatus is installed, and the radio base station apparatus carries out transmission and reception with mobile station apparatuses lying the cell in question.

In such a radio base station apparatus, it is necessary to accurately control transmission power so that a transmission signal covers within its own cell without affecting other cells.

Particularly, in the radio base station apparatus for transmitting a plurality of channels with the channels multiplexed, the following problems arise when all of the channels multiplexed are transmitted at equal transmission power. That is, interference occurs in mobile station apparatuses in the vicinity of the radio base station apparatus due to too strong electric wave and it is possible to normally receive the transmission signal in mobile station apparatuses away from the radio base station apparatus due to too weak electric wave. In addition, inasmuch as the radio base station apparatus naturally has a limited transmission power enable to output, it is necessary to assign the limited transmission power to each mobile station apparatus or each channel. Under the circumstances, it is necessary for the radio base station apparatus to adjust the transmission power each channel in accordance with factors such as a distance between each mobile station apparatus and the radio base station apparatus in question.

In addition, in the CDMA communication system, when the channels to be multiplexed increase, the whole transmission power increases. As a result, it is possible to insure a lot of usable channels by accurately controlling the transmission power for each channel at the necessary lowest limit in a plurality of channels multiplexed in consideration of near-far problem. Accordingly, it is desirable to accurately carry out transmission power control for each channel.

In a transmitting apparatus carrying out such a multiplexing, a conventional transmission power control unit necessitates a digital-to-analog converter for converting a digital signal indicative of a digital value into an analog signal indicative of an analog value. This is because to adjust an output of a power amplifier demands the analog value although a control value for carrying out the power control is given by the digital value.

Incidentally, the above-mentioned transmission power control is carried out on the premise that the digital-to-analog converter in the transmission power control unit operates ideally. However, actually, a variation amount of the digital signal and a variation amount of an analog signal to be outputted are not perfectly coincident with each other and the digital-to-analog converter may have a demolished linearity. In addition, the digital-to-analog converter is supplied with a reference voltage or a power supply voltage which may vary. As a result, the conventional transmission power control unit is disadvantageous in that it is impossible to obtain a correct analog amount corresponding to the digital value using the digital-to-analog converter and it is difficult to actually carry out correct transmission power control.

In addition, the conventional transmission power control unit is disadvantageous in that precision in the power control degrades due to the influence of variation of temperature and secular change in a part of analog circuits in the next stage of the digital-to-analog converter.

Furthermore, it is necessary for the CDMA communication system to carry out control of the transmission power each channel as described above. However, the conventional transmission power control unit is disadvantageous in that it is impossible to detect the transmission power each channel that is actually transmitted because each channel is multiplexed on the same radio carrier.

Various CDMA communication systems related to the present invention are already known. An example is disclosed in U.S. Pat. No. 5,737,327 which is issued to Ling et al. on Apr. 7, 1998 and which has a title of "Method and apparatus for demodulation and power control bit detection in a spread spectrum communication system." According to Ling et al., a receiver circuit receives a spread spectrum communication signal, such as a DS-CDMA signal, including a pilot channel and including a power control designator. The spread spectrum communication signal is despread and decoded. The pilot symbols on the pilot channel are provided to a channel estimator for estimating the channel phase and channel gain of the communication channel. This estimate is provided to a demodulator for demodulating the traffic channel symbols. The pilot symbols are provided to another channel estimator for estimating channel phase and channel gain for the power control designator. This estimate is provided another demodulator for demodulating the power control designator. The traffic channel symbols are delayed a predetermined time in a delay element before demodulating. The power control designator is delayed a short time or not at all in a short delay element before demodulation.

Japanese Unexamined Patent Publication of Tokkai No. Hei 7-235,913 or JP-A 7-235913 discloses a spread spectrum communication equipment and signal intensity detecting device which are capable of informing a user a stable talking standard by measuring the signal power intensity of a base station in a spread spectrum communication mode. According to JP-A 7-235913, in a spread spectrum communication equipment, the gain control signal sent from a detector of an automatic gain control (AGC) circuit is converted into the electric power serving as the signal intensity by another detector and sent to a multiplier. The electric power of the desired pilot channel of a base station is detected out of the output signal received from the AGC circuit by a spread code detector and sent to the multiplier. The multiplier calculates the signal intensity of the desired base station based on the received electric power and sends it to a display part. Then the display part shows the signal intensity.

Japanese Unexamined Patent Publication of Tokkai No. Hei 8-8,877 or JP-A 8-008877 discloses a spread spectrum radio communication system and radio communication equipment used in the system which are capable of eliminating the need of complicated numerical arithmetic operation in a mobile station and the transmission of surrounding signal, of improving communication efficiency, of miniaturizing and lightening a mobile station equipment, and of lowering power consumption. According to JP-A 8-008877, in a base station, the radio transmission characteristics of a forward link are estimated by a parameter estimation part based on the reception state of radio signals arriving from the mobile station through a reverse link, RAKE control information to be set in the RAKE receiver of the mobile station is generated based on the estimated result and the mobile station is informed of the RAKE control information. On the other hand, in the mobile station, the RAKE control information is extracted in a RAKE control information extraction part and a tap coefficient is initially set in the transversal filter of the RAKE receiver based on the RAKE control information.

Japanese Unexamined Patent Publication of Tokkai No. Hei 10-41,919 or JP-A 10-041919 discloses a CDMA system multiplex transmitter which is capable of attaining reception always stably from all channels by inserting a power measurement power control code to a spread code of each channel measuring transmission power of each channel in an output of a radio section so as to control the transmission power of each channel to be arranged as a prescribed value. According to JP-A 10-041919, a power control section uses transmission data spread and outputted from a channel section as a first input and uses a power control signal outputted from a despread section as a second input to select and correct amplitude data and provide an output. A frequency conversion section receiving a power control output converts the signal into a prescribed frequency band and provides an output. The despread section uses the frequency-converted signal as a first input and uses the power control code generated by a power control code generating section as a second input to conduct despread processing thereby detecting an instantaneous power of each channel. The despread processing is conducted in the order of channels according to a clock received from a timing control section and a power control signal is outputted to each power control section.

Japanese Unexamined Patent Publication of Tokkai No. Hei 9-284,212 or JP-A 9-284212 discloses a spread spectrum communication system which is capable of reducing interference onto its own station adjacent cells and of increasing a subscriber capacity while eliminating a nearfar problem by adjusting a process gain depending on a distance of a mobile station from a center of a cell. According to JP-A 9-284212, an information transmission section of a transmission section applies primary modulation to information data consisting of a voice signal, data and an image or the like based on a data clock from a data clock generator to be information data having a prescribed data transmission speed and the resulting data are given to a spread modulation section. Furthermore, a PN clock from a PN clock generator is given to a PN generator, from which a PN signal with a prescribed spread speed is generated and given to the spread modulation section. Then a distance from a base station is estimated, each mobile station adjusts a spread speed based on the estimated distance. The spread speed is adjusted by controlling a clock frequency from the PN clock generator to be supplied to the PN generator.

SUMMARY OF THE INVENTION

It is therefore an object of the present invention to provide a transmission power control circuit which is capable of accurately carrying out transmission power control each channel.

Other objects of this invention will become clear as the description proceeds.

According to a first aspect of this invention, a transmission power control method controls transmission power in a digital signal. The transmission power control method comprises the steps of converting the digital signal into an analog signal by a digital-to-analog converter, of power amplifying the analog signal into a power-amplified signal by a power amplifier, of extracting a part of the power-amplified signal as an extracted signal, and of adjusting the digital signal using the extracted signal.

According to a second aspect of this invention, a transmission power control method controls transmission power in a transmission amplitude datum. The transmission power control method comprises the steps of spreading the transmission amplitude datum into a spread datum, of converting the spread datum into a transmission signal, of extracting a part of the transmission signal as an extracted signal, and of adjusting the transmission amplitude datum on the basis of the extracted signal.

According to a third aspect of this invention, a transmission power control method controls transmission power in a transmission amplitude datum. The transmission power control method comprises the steps of spreading the transmission amplitude datum into a spread datum, of converting the spread datum into a transmission signal, of extracting a part of the transmission signal as an extracted signal, of despreading the extracted signal to obtain transmission power in the transmission amplitude datum, and of adjusting the transmission amplitude datum on the basis of the obtained transmission power.

According to a fourth aspect of this invention, a transmission power control method controls transmission power in a transmitting apparatus for transmitting first through N-th transmission amplitude data for first through N-th channels with the first through the N-th transmission amplitude data multiplexed, where N represents a positive integer which is not less than two. The transmission power control method comprises the steps of spreading the first through the N-th transmission amplitude data into first through N-th spread data, respectively, of multiplexing the first through the N-th spread data into a multiplexed amplitude datum, of converting the multiplexed amplitude datum into a transmission signal, of extracting a part of the transmission signal as an extracted signal, of despreading the extracted signal to produce first through N-th detected signals indicative of transmission power for the first through the N-th channels, respectively, and of adjusting the first through the N-th transmission amplitude data on the basis of the first through the N-th detected signals, respectively.

According to a fifth aspect of this invention, a transmission power control unit is for use in a transmitting apparatus for transmitting first through N-th power-controlled transmission amplitude data for first through N-th channels with the first through the N-th power-controlled transmission amplitude data multiplexed, where N represents a positive integer which is not less than two. The transmission power control unit comprises first through N-th power control amount correctors supplied with the first through the N-th power-controlled transmission amplitude data, respectively. The first through the N-th power control amount correctors carry out, on the basis of first through N-th detected signals, correction of first through N-th power control amounts on the first through the N-th power-controlled transmission amplitude data to produce first through N-th corrected data, respectively. A power control correction code generator generates a power control correction code for detection of transmission power. Connected to the first through the N-th power control amount correctors, respectively, and to the power control correction code generator in common, first through N-th spreading sections carry out first through N-th spread processings on the first through the N-th corrected data using first through N-th replaced spreading codes into which respective parts of first through N-th spreading codes assigned with the first through the N-th channels are replaced with the power control correction code, respectively. The first through the N-th spreading section produce first through N-th spread data. Connected to the first through the N-th spreading sections, a multiplexer multiplexes the first through the N-th spread data by summing up the first through the N-th spread data. The multiplexer produces a multiplexed amplitude datum. Connected to the multiplexer, a digital-to-analog converter converts the multiplexed amplitude datum into an analog signal having an analog value corresponding to the multiplexed amplitude datum. Connected to the digital-to-analog converter, a radio section carries out modulation, frequency conversion, and power amplification on the analog signal to produce a transmission signal. Connected to the radio section, an extracting arrangement extracts a part from the transmission signal as an extracted signal. Connected to the extracting arrangement, a frequency converter converts the extracted signal into a frequency-converted signal having a frequency which enables the frequency-converted signal to digitally process. Connected to the frequency converter, the power control correction code generator, and the first through the N-th power control amount correctors, a despreading section carries out a despread processing on the frequency-converted signal to detect first through N-th momentary transmission power for the first through the N-th channels. The despreading section supplies the first through the N-th power control amount correctors with the first through the N-th detected signals indicative of the first and the N-th momentary transmission power, respectively. Connected to the despreading section and the first through the N-th spreading sections, a timing controller generates a clock signal for synchronizing the despreading section and the first through the N-th spreading sections. The timing controller supplies the despreading section with the clock signal. The timing controller supplies the first through the N-th spreading sections with first through N-th timing signals, respectively.

According to a sixth aspect of this invention, a transmission power control method controls transmission power in a radio base station apparatus for use in a code division multiple access (CDMA) system. The transmission power control method comprises the steps of replacing a part of a spreading code assigned with each channel with a power control correction code having orthogonality to produce a replaced spreading code, the power control correction code having a code length which is extremely shorter than that of the spreading code, of spreading a spectrum of a transmission datum using the replaced spreading code to produce a transmission signal, of despreading the transmission signal using the power control correction code to measure transmission power in the transmission datum each channel, and of carrying out, on the basis of measured transmission power, transmission power control for the transmission datum each channel.

BRIEF DESCRIPTION OF THE DRAWINGS

FIG. 6A is a view showing the power control correction code generated by a power control correction code generator for use in the transmission power control unit illustrated in FIG. 2;

FIG. 6B is a view showing the spreading code generated by a spreading code generator for use in the spreading section illustrated in FIG. 4;

FIG. 7 is a block diagram of a timing controller for use in the transmission power control unit illustrated in FIG. 2;

FIG. 8A is a timing chart showing a clock signal outputted by the timing controller illustrated in FIG. 8;

FIG. 8B is a timing chart showing a first timing signal outputted by the timing controller illustrated in FIG. 8;

FIG. 8C is a timing chart showing a second timing signal outputted by the timing controller illustrated in FIG. 8;

DESCRIPTION OF THE PREFERRED EMBODIMENTS

Figure 1:
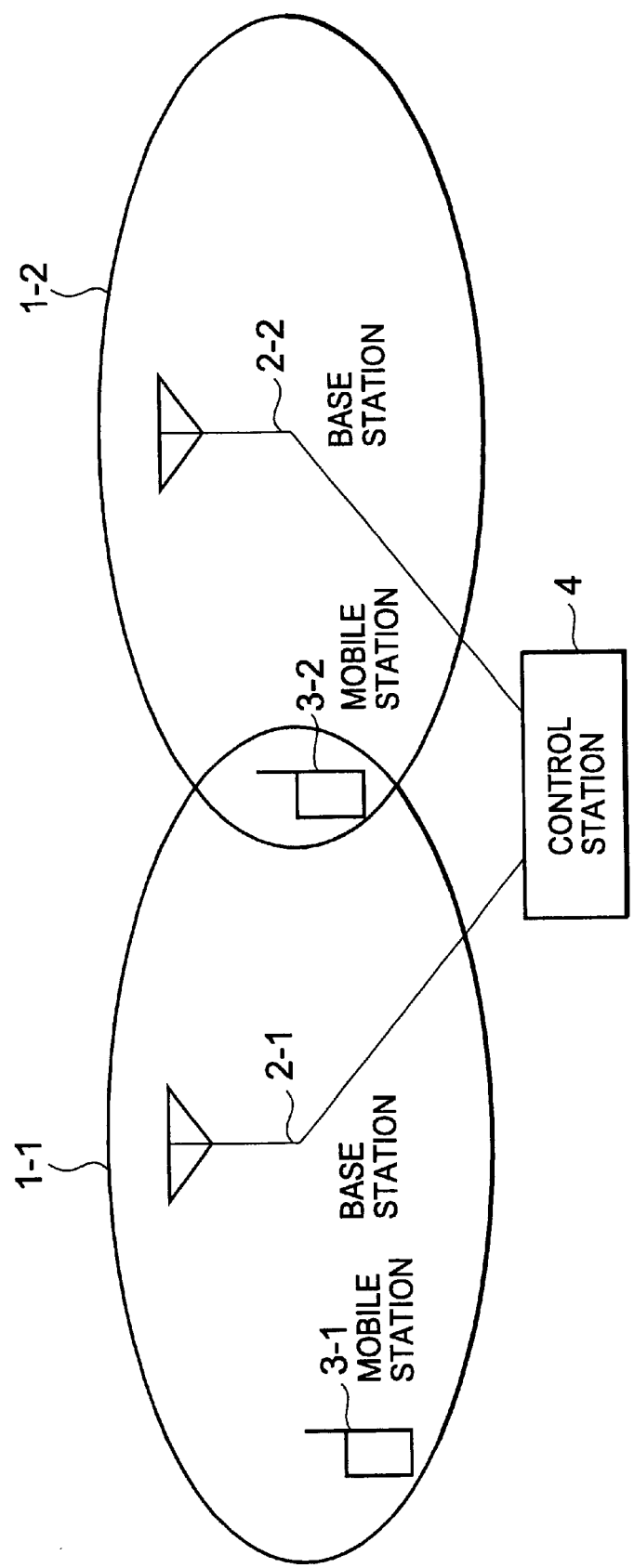
FIG. 1 is a block diagram of a code division multiple access (CDMA) cellular mobile communication system to which a transmission power control method according to the present invention is applicable.

Referring to FIG. 1, description will proceed to a code division multiple access (CDMA) cellular mobile communication system to which transmission power control units according to embodiments of the present invention are applicable. The illustrated CDMA cellular mobile communication system has a service area. The service area is divided into first and second cells 1-1 and 1-2 in which first and second base station apparatuses 2-1 and 2-2 are installed, respectively, and in which first and second mobile station apparatuses 3-1 and 3-2 lie. In other words, the first base station apparatus 2-1 covers the first cell 1-1 while the second base station apparatus 2-2 covers the second cell 1-2. In the example being illustrated, the first mobile station 3-1 lies in an area which is overlapped in the first and the second cells 1-1 and 1-2 while the second mobile station 3-2 lies in the first cell 1-1. The first and the second base station apparatuses 2-1 and 2-2 are connected to a control station 4 which is connected to a communication network (not shown) including other control stations. Although illustration is omitted from FIG. 1, the CDMA cellular mobile communication system comprises other lots of base stations installed in other cells in which a lot of mobile station apparatuses lie.

In the manner which will presently become clear, each of the first and the second base station apparatuses 2-1 and 2-2 and the first and the second mobile station apparatuses 3-1 and 3-2 comprises the transmission power control unit.

Figure 2:
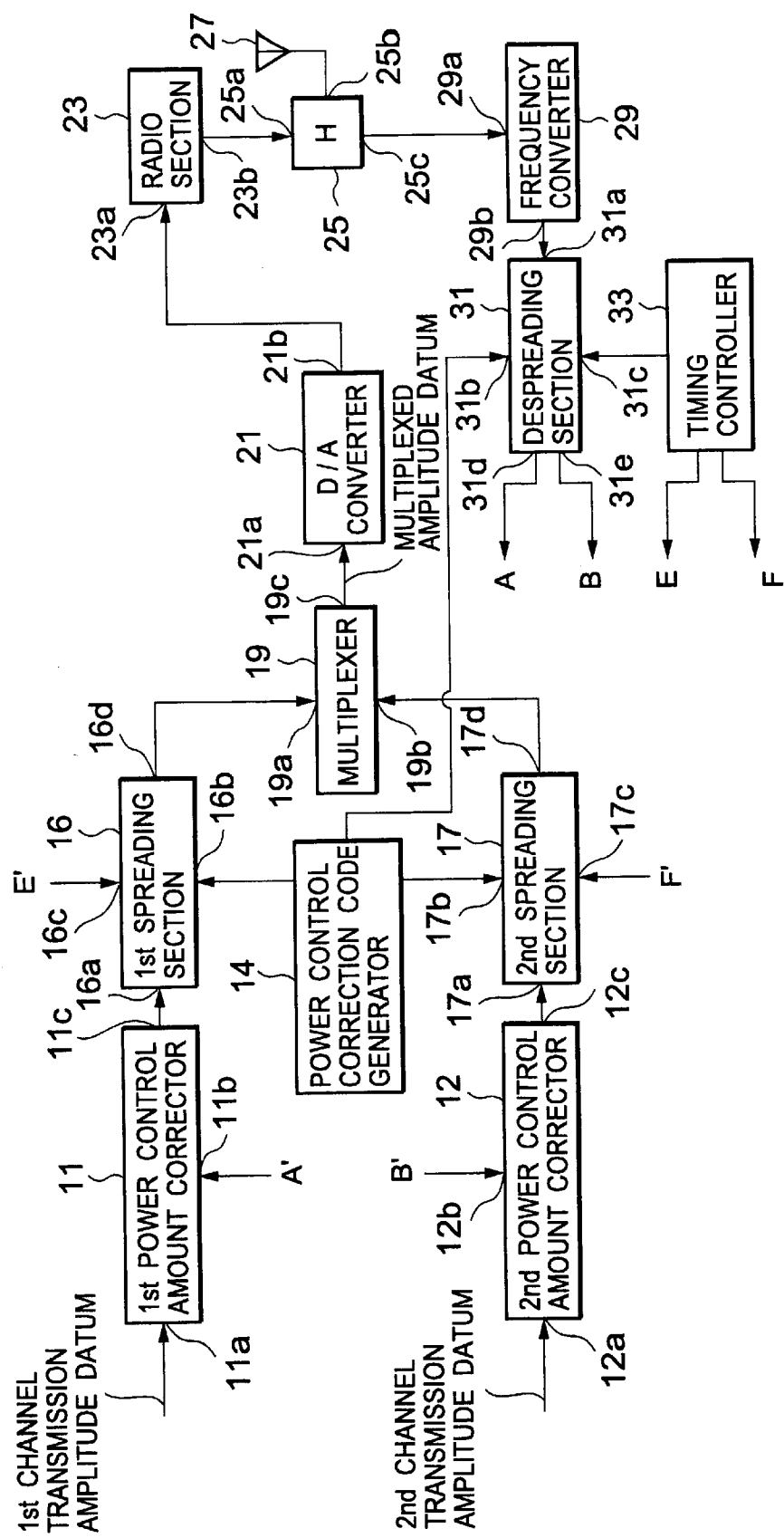
FIG. 2 is a block diagram of a transmission power control unit according to a first embodiment of this invention for use in the CDMA cellular mobile communication system illustrated in FIG. 1.

Referring to FIG. 2, description will proceed to a transmission power control unit according to a first embodiment of the present invention. The illustrated transmission power control unit is a unit included in a radio base station apparatus which carries out a two-channel multiplexing transmission where a first channel and a second channel are multiplexed. In FIG. 2, reference symbols A, B, E, and F are connected to reference symbols A', B', E', and F', respectively.

As illustrated in FIG. 2, the transmission power control unit comprises first and second power control amount correctors 11 and 12, a power control correction code generator 14, first and second spreading sections 16 and 17, a multiplexer 19, a digital-to-analog converter 21, a radio section 23, a distributor or a branching filter 25, an antenna 27, a frequency converter 29, a despreading section 31, and a timing controller 33.

The first power control amount corrector 11 has a datum input terminal 11a supplied with a first power-controlled transmission amplitude datum for the first channel and a control input terminal 11b supplied with a first detected signal indicative of first momentary transmission power for the first channel from the despreading section 31 in the manner in which will later become clear. The first power control amount corrector 11 carries out, on the basis of the first detected value, correction of a first power control amount for the first power-controlled amplitude datum to produce a first corrected datum from a datum output terminal 11c thereof.

Likewise, the second power control amount corrector 12 has a datum input terminal 12a supplied with a second power-controlled transmission amplitude datum for the second channel and a control input terminal 12b supplied with a second detected signal indicative of second momentary transmission power for the second channel from the despreading section 31 in the manner which will later become clear. The second power control amount corrector 12 carries out, on the basis of the second detected value, correction of a second power control amount for the second power-controlled amplitude datum to produce a second corrected datum from a datum output terminal 12c thereof. The first and the second corrected data are supplied to the first and the second spreading sections 16 and 17, respectively.

The power control correction code generator 14 generates a power control correction code for detecting transmission power in the first and the second corrected data which are supplied to the first and the second spreading sections 16 and 17. The first spreading section 16 has a datum input terminal 16a supplied with the first corrected datum from the first power control amount corrector 11, a code input terminal 16b supplied with the power control correction code from the power control correction code generator 14, and a control input terminal 16c supplied with a first timing signal from the timing controller 33 in the manner which will later become clear. Responsive to the first timing signal, the first spreading section 16 carries out a first spreading processing on the first corrected data using the power control correction code in the manner which will later become clear. The first spreading processing is for realizing a code division multiple access communication. The first spreading section 16 produces a first spread datum from a datum output terminal 16d thereof.

Similarly, the second spreading section 17 has a datum input terminal 17a supplied with the second corrected datum from the second power control amount corrector 12, a code input terminal 17b supplied with the power control correction code from the power control correction code generator 13, and a control input terminal 17c supplied with a second timing signal from the timing controller 31 in the manner which will later become clear. Responsive to the second timing signal, the second spreading section 17 carries out a second spreading processing on the second corrected datum using the power control correction code in the manner which will later become clear. The second spreading processing is for realizing the code division multiple access communication. The second spreading section 17 produces a second spread datum from a datum output terminal 17d thereof.

The first and the second spread data are supplied to the multiplexer 19.

The multiplexer 19 has a first datum input terminal 19a supplied with the first spread datum and a second datum input terminal 19b supplied with the second spread datum. The multiplexer 19 carries out a multiplexing processing on the first and the second spread data by adding the first spread datum to the second spread datum. The multiplexer 19 produces a multiplexed amplitude datum from a datum output terminal 19c thereof. The multiplexed amplitude datum is supplied to the digital-to-analog converter 21.

The digital-to-analog converter 21 has a datum input terminal 21a supplied with the multiplexed amplitude datum from the multiplexer 19. The digital-to-analog converter 21 converts the multiplexed amplitude datum into an analog signal indicative of an analog value which corresponds to the multiplexed amplitude datum. The digital-to-analog converter 21 produces the analog signal from a signal output terminal 21b thereof. The analog signal is supplied to the radio section 23.

The radio section 23 has a signal input terminal 23a supplied with the analog signal from the digital-to-analog converter 21. The radio section 23 carries out modulation, frequency conversion, and power amplification on the analog signal. The radio section 23 produces a transmission signal from a signal output terminal 23b thereof. The transmission signal is supplied to the distributor 25. The distributor 25 has a signal input terminal 25a supplied with the transmission signal from the radio section 23. The distributor 25 distributes the transmission signal to the antenna 27 and the frequency converter 29. In other words, the distributor 25 supplies first and second distributed transmission signals from first and second signal output terminals 25b and 25c thereof to the antenna 27 and the frequency converter 29, respectively. The second distributed transmission signal is called an extracted signal. That is, the distributor 25 acts as an extracting arrangement for extracting a part of the transmission signal as the extracted signal.

The frequency converter 29 has a signal input terminal 29a supplied with the second distributed transmission signal or the extracted signal from the distributor 25. The frequency converter 29 frequency converts the second distributed transmission signal or the extracted signal into a frequency-converted signal having a frequency which enables the frequency-converted signal to digitally process. The frequency-converted signal is supplied to the despreading section 31.

The despreading section 31 has a signal input terminal 31a supplied with the frequency-converted signal from the frequency converter 27, a code input terminal 31b supplied with the power control correction code from the power control correction code generator 14, and a control input terminal 31c supplied with a clock signal from the timing controller 31 in the manner which will later become clear. Responsive to the clock signal, the despreading section 31 carries out a despreading processing on the frequency-converted signal using the power control correction code to detect momentary transmission power of the frequency-converted signal. The despreading section 31 produces the first and the second detected signals indicative of first and second momentary transmission power for the first and the second channels from first and second signal output terminals 31d and 31e thereof, respectively. The first and the second detected signals are sent to the first and the second power control amount correctors 11 and 12, respectively.

The timing controller 33 generates the clock signal for synchronizing the first and the second spreading sections 16 and 17 and the despreading section 31. The timing controller 33 supplies the clock signal to the despreading section 31. In addition, the timing controller 33 supplies first and second timing signals to the first and the second spreading sections 16 and 17, respectively.

Description will be made as regards operation of the transmission power control unit illustrated in FIG. 2. In the CDMA communication system, multiplexing is realized by assigning spreading codes to respective channels. Each spreading code has a superior auto-correlation characteristic.

In this embodiment, a part of the spreading code assigned to each channel is replaced with the power control correction code. In other words, the spreading code is replaced by using the power control correction code with a replaced spreading code. The power control correction code has orthogonality and has a code length which is extremely shorter than that of the spreading code. In this event, replacement positions to the power control correction code for respective channels are different from each other. In addition, the transmission power control unit spreads spectra of transmission data using the respective replaced spreading codes to obtain spread data and generates the transmission signal by multiplexing the spread data. Thereafter, the transmission power control unit extracts a part from the transmission signal to obtain the extracted signal or the second distributed transmission signal, despreads the extracted signal using the power control correction code to obtain auto-correlation for the power control correction code each channel, and results in obtaining the transmission power each channel. That is, in this embodiment, it is possible to improve precision of the transmission power control each channel by feeding back so that the transmission power each channel obtained by despreading operation has a desired value.

Referring now to FIG. 2, the description of operation in the transmission power control unit will be made. The first and the second power-controlled transmission amplitude data are supplied to the first and the second power control amount correctors 11 and 12, respectively.

The first power control amount corrector 11 calculates a first transmission average amplitude datum by temporally averaging a plurality of first power-controlled transmission amplitude data for any time duration and calculates first average transmission power by temporally averaging the first momentary transmission power values for the first channel. Subsequently, the first power control amount corrector 11 calculates a first error between the first transmission average amplitude datum and the first average transmission power and corrects the first power-controlled transmission amplitude datum so as to negate the first error to produce the first corrected datum. The first corrected datum is supplied to the first spreading section 16.

Likewise, the second power control amount corrector 12 calculates a second transmission average amplitude datum by temporally averaging a plurality of second power-controlled transmission amplitude data for any time duration and calculates second average transmission power by temporally averaging the second momentary power values for the second channel. Subsequently, the second power control amount corrector 12 calculates a second error between the second transmission average amplitude datum and the second average transmission power and corrects the second power-controlled transmission amplitude datum so as to negate the second error to produce the second corrected datum. The second corrected datum is supplied to the second spreading section 17.

Figure 3:
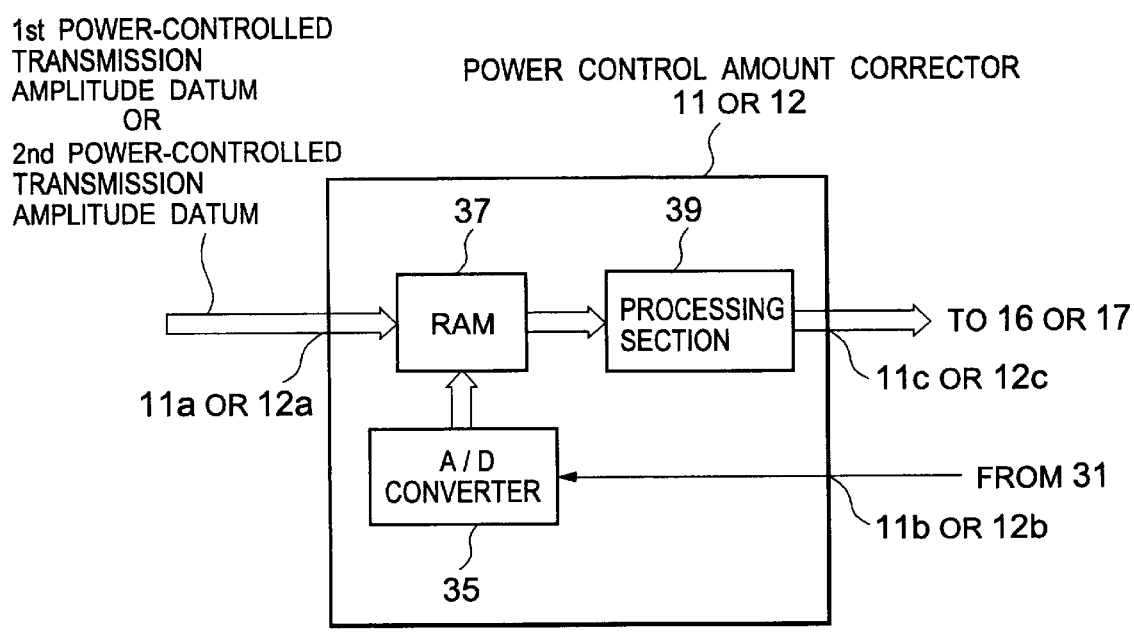
FIG. 3 is a block diagram of a power control amount corrector for use in the transmission power control unit illustrated in FIG. 2.

Turning to FIG. 3, the description will proceed to the first and the second power control amount correctors 11 and 12. Inasmuch as the first and the second power control amount correctors 11 and 12 are similar in structure, the description will proceed to only the first power control amount corrector 11.

The first power control amount corrector 11 comprises a first analog-to-digital converter 35, a first random access memory (RAM) 37, and a first processing section 39. The first analog-to-converter 35 converts the first detected signal indicative of the first momentary power value for the first channel into a first momentary transmission power datum. The first momentary power datum is supplied to the first random access memory 37. The first random access memory 37 is supplied with the first power-controlled transmission amplitude datum. The first random access memory 37 successively stores the first momentary transmission power datum and the first power-controlled transmission amplitude datum as first stored momentary transmission power data and first stored power-controlled transmission amplitude data. That is, the first random access memory 37 serves as a buffer for temporarily storing the first stored momentary transmission power data and the first stored power-controlled transmission amplitude data. The first stored momentary transmission power data and the first stored power-controlled transmission amplitude data are supplied to the first processing section 39.

The first processing section 39 carries out the above-mentioned processing regarding the first channel. That is, the first processing section 39 calculates the first transmission average amplitude datum by temporally averaging the first stored power-controlled transmission amplitude data and calculates the first average transmission power datum by temporally averaging the first stored momentary transmission power data. Subsequently, the first processing section 39 calculates the first error between the first transmission average amplitude datum and the first average transmission power datum and corrects the first power-controlled transmission amplitude datum so as to negate the first error to produce the first corrected datum. The first corrected datum is supplied to-the first spreading section 16.

Figure 4:
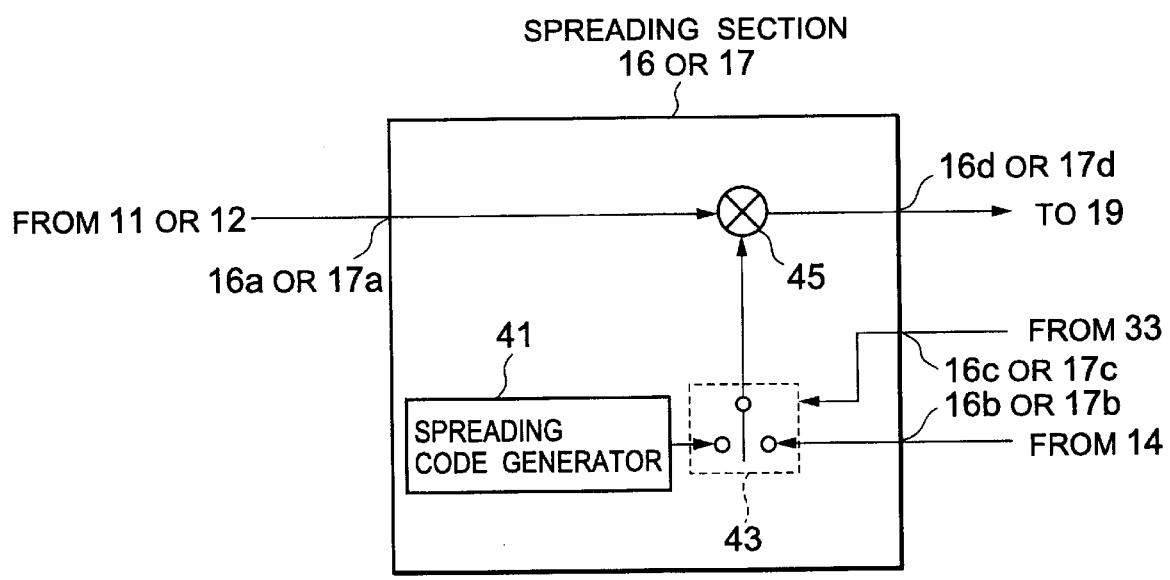
FIG. 4 is a block diagram of a spreading section for use in the transmission power control unit illustrated in FIG. 2.

Turning to FIG. 4, the description will proceed to the first and the second spreading sections 16 and 17. Inasmuch as the first and the second spreading sections 16 and 17 are similar in structure, the description will proceed to only the first spreading section 16.

The first spreading section 16 comprises a first spreading code generator 41, a first switch 43, and a first multiplier 45. The first spreading code generator 41 generates a first spreading code for the first channel for realizing the CDMA communication. The first spreading code is supplied to the first switch 43. The first switch 43 is also supplied with the power control correction code from the power control correction code generator 14 (FIG. 2). Furthermore, the first switch 43 is supplied with, as a first selection signal, the first timing signal from the timing controller 33 (FIG. 2). Responsive to the first selection signal or the first timing signal, the first switch 43 selects, as a first selected code, one of the first spreading code and the power control correction code. When the first timing signal is present, the first switch 43 selects the power control correction code as the first selected code. When the first timing signal is absent, the first switch 43 selects the first spreading code as the first selected code. The first selected code is referred to as a first replaced spreading code. At any rate, the first switch 43 acts as a first replacement arrangement for replacing a part of the first spreading code with the power control correction code to produce the first replaced spreading code.

The first replaced spreading code or the first selected code is supplied to the first multiplier 45. The first multiplier 45 is also supplied with the first corrected datum from the first power control amount corrector 11 (FIG. 2). The first multiplier 45 carries out the first spreading processing on the first corrected datum using the first replaced spreading code by multiplying the first corrected datum by the first replaced spreading code. The first multiplier 45 produces the first spread datum which is supplied to the multiplexer 19.

Attention will directed to the spreading code generator such as the first spreading code generator 41. The spreading code generator repeatedly generates a pseudo noise code as the spreading code. Generated by the spreading code generator, the spreading code has an output time shifted each channel. In the example being illustrated, the pseudo noise code is a maximum length sequence code having a period of $(2^{15}-1)$ bits. The maximum length sequence code may be generated by a maximum length sequence generator (not shown) which is composed of fifteen D-type flip-flops and several exclusive OR circuits.

In addition, the power control correction code for replacing a part of the spreading code may be generated in the similar manner. The power control correction code is generated at the same timing related to the spreading code. In addition, the power control correction code has an extremely short code length in comparison with the spreading code in order to do not make division multiple communication ability each channel as natural purpose degrade. In the example being illustrated, the power control correction code is a maximum length sequence code having a period of $(2^4-1)$ bits.

Figure 5A:
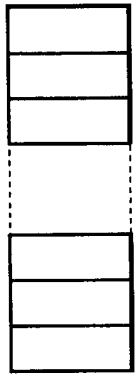
FIG. 5A is a view showing a code length of a power control correction code for use in the transmission power control unit illustrated in FIG. 2.
Figure 5B:
FIG. 5B is a view showing a code length of a spreading code for use in the transmission power control unit illustrated in FIG. 2.

FIGS. 5A and 5B show the code lengths of the power control correction code and the spreading code, respectively. The power control correction code has the code length of 15 bits as shown in FIG. 5A while the spreading code has the code length of 32,767 bits as shown in FIG. 5B. Although the power control correction code is about 1/2,200 of the spreading code, the power control correction code basically may have the code length which is freely selected.

Referring to FIGS. 6A and 6B, the description will proceed to the first replaced spreading code produced by the first switch 43. FIG. 6A shows the power control correction code generated by the power control correction code generator 14 illustrated in FIG. 2 while FIG. 6B shows the first spreading code generated by the first spreading code generator 41 illustrated in FIG. 4. In FIGS. 6A and 6B, numbers in figures are numbers indicative of bit positions of the power control correction code and the spreading code illustrated in FIGS. 5A and 5B. In addition, the spreading codes for the respective channels are repeated at a different timing. That is, the spreading code has an orthogonality each channel.

Now, although a part of the spreading code shown in FIG. 6B is replaced with the power control correction code shown in FIG. 5A by the first switch 43 illustrated in FIG. 4, the description will proceed to timing of this replacement. Timings replaced with the power control correction code are arranged without overlapping at each channel. This is because it is necessary to identify the power control correction code for which channel after multiplexing. Replacement of the part of the spreading code with the power control correction code is realized by switching the first switch 43 in synchronism with the first timing signal produced by the timing controller 33 (FIG. 2).

Referring to FIG. 7, the description will proceed to the timing controller 33 illustrated in FIG. 2. The timing controller 33 comprises a clock oscillator 47 and a selector 49. The clock oscillator 47 oscillates the clock signal G having a predetermined clock frequency. The clock signal G comprises a plurality of clock pulses. The clock signal G is supplied to the selector 49. The selector 49 selects ones of the clock pulses in the clock signal to produce the first and the second timing signals H and J which are supplied to the first and the second spreading section 16 and 17, respectively. In addition, the clock signal G is supplied to the despreading section 31.

FIGS. 8A through 8C show timing charts of the signals produced by the timing controller 33 illustrated in FIG. 7. FIG. 8A shows a timing chart of the clock signal G. FIG. 8B shows another timing chart of the first timing signal H. FIG. 8C shows still another timing chart of the second timing signal J. In FIGS. 8A through 8C, the number of bits indicates a time width corresponding to the number of bits.

In the example being illustrated, the clock signal G has a pulse width corresponding to 15 bits and a pulse period corresponding to 30 bits, as illustrated in FIG. 8A. The first timing signal H is a part selected from the clock pulses in the clock signal and has a pulse width corresponding to 15 bits and a period corresponding to 32,760 bits, as illustrated in FIG. 8B. As illustrated in FIG. 8C, the second timing signal J is another part which is selected from the clock pulses in the clock signal and is different from the first timing signal H and has a pulse width corresponding to 15 bits and a period corresponding to 32,760 bits.

Now, the first and the second spreading sections 16 and 17 produce the first and the second spread signals which are multiplied by the multiplexer 19 to obtain the multiplexed amplitude datum. The multiplexed amplitude datum is supplied to the digital-to-analog converter 21.

The description will proceed to operation of the digital-to-analog converter 21 and thereafter. The digital-to-analog converter 21 converts the multiplexed amplitude datum into the analog signal indicative of the analog amount. The analog signal is supplied to the radio section 23. The radio section 23 carries out modulation, frequency conversion, and power amplification on the analog signal.

Figure 9:
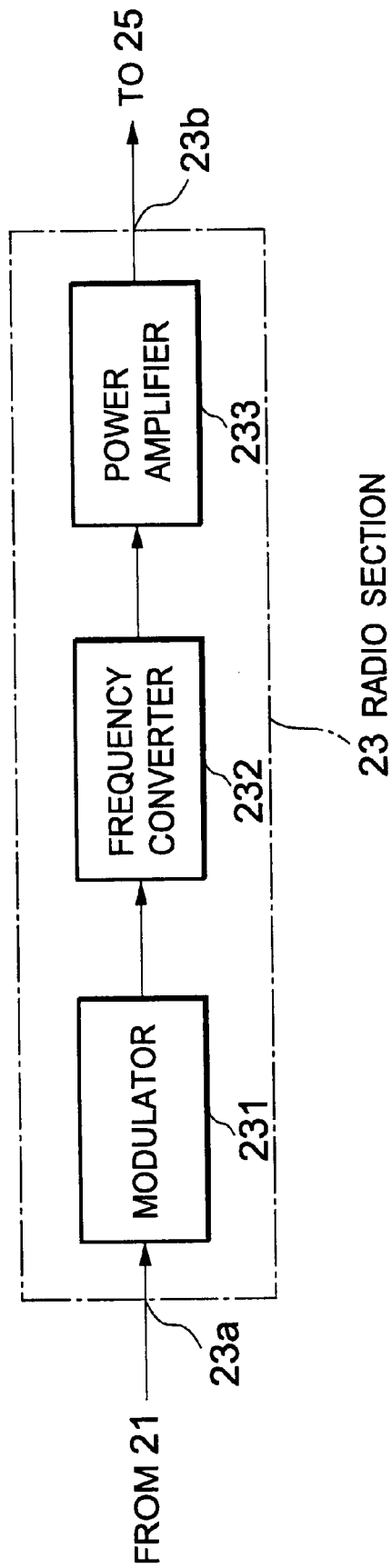
FIG. 9 is a block diagram of a radio section for use in the transmission power control unit illustrated in FIG. 2.

Turning to FIG. 9, the description will proceed to the radio section 23. The radio section 23 comprises a modulator 231, a frequency converter 232, and a power amplifier 233. The modulator 231 modulates a carrier having an intermediate frequency by the analog signal to produce a modulated signal. The modulated signal is supplied to the frequency converter 232. The frequency converter 232 converts the modulated signal having the intermediate frequency into a frequency-converted signal having a high or radio frequency. The frequency-converted signal is supplied to the power amplifier 233. The power amplifier 233 power amplifies the frequency-converted signal into a power-amplified signal. The radio section 23 produces the power-amplified signal as the transmission signal which is supplied to the distributor 25 (FIG. 2).

Turning back to FIG. 2, the distributor 25 distributes the transmission signal as the first and the second distributed transmission signals to the antenna 27 and the frequency converter 29, respectively. The second distributed transmission signal is called the extracted signal. In other words, the distributor 25 serves as the extracting arrangement for extracting a part of the transmission signal as the extracted signal. The extracted signal is supplied to the frequency converter 29.

The frequency converter 29 converts the extracted signal or the second distributed transmission signal into the frequency-converted signal having the frequency which enables the frequency-converted signal to digitally process. The frequency-converted signal is supplied to the despreading section 31. The despreading section 31 carries out despreading operation by multiplying the frequency-converted signal by the power control correction code as shown in FIG. 6A.

Figure 10:
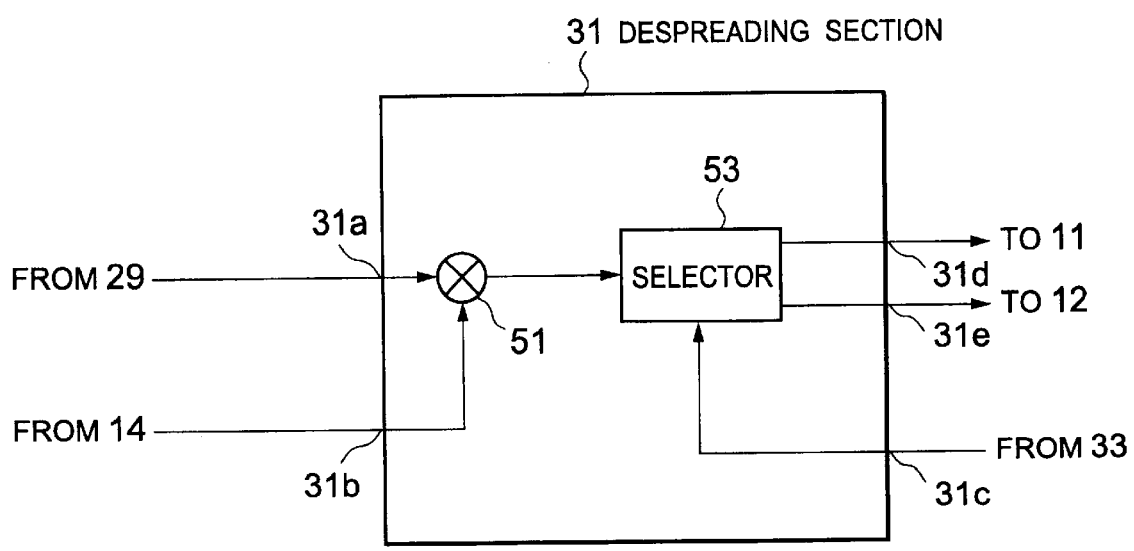
FIG. 10 is a block diagram of a despreading section for use in the transmission power control unit illustrated in FIG. 2.

Turning to FIG. 10, the description will proceed to the despreading section 31. The despreading section 31 comprises a multiplier 51 and a selector 53. The multiplier 51 carries out the despreading operation by multiplying the frequency-converted signal produced by the frequency converter 29 by the power control correction code shown in FIG. 6A that is generated by the power control correction code generator 14. The multiplier 51 produces a despread signal which is supplied to the selector 53. The selector 53 selects destinations for the despread signal in synchronism with the clock signal produced by the timing controller 33 (FIG. 7).

In the despreading section 31, the selector 53 is switched at timings identical with the timings where the part of the spreading code is replaced with the power control correction code. As a result, the despreading section 31 can send the first detected signal indicative of the first momentary transmission power for the first channel to the first power control amount corrector 11. In addition, the despreading section 31 can send the second detected signal indicative of the second momentary transmission power for the second channel to the second power control amount corrector 12. As described above, the first power control amount corrector 11 carries out correction of the power control amount in the first power-controlled amplitude datum in response to the first detected signal while the second power control amount corrector 12 carries out correction of the power control amount in the second power-controlled amplitude datum in response to the second detected signal.

At any rate, a combination of the frequency converter 29, the despreading section 31, the timing controller 33, the power control correction code generator 14, and the first and the second power control amount correctors 11 and 12 serves as an adjusting arrangement for adjusting digital signals using the extracted signal. In other words, a combination of the frequency converter 29, the despreading section 31, the timing controller 33, the power control correction code generator 14, and the first and the second power control amount correctors 11 and 12 is operable as an adjusting arrangement for adjusting the transmission amplitude data on the basis of the extracted signal.

Figure 11:
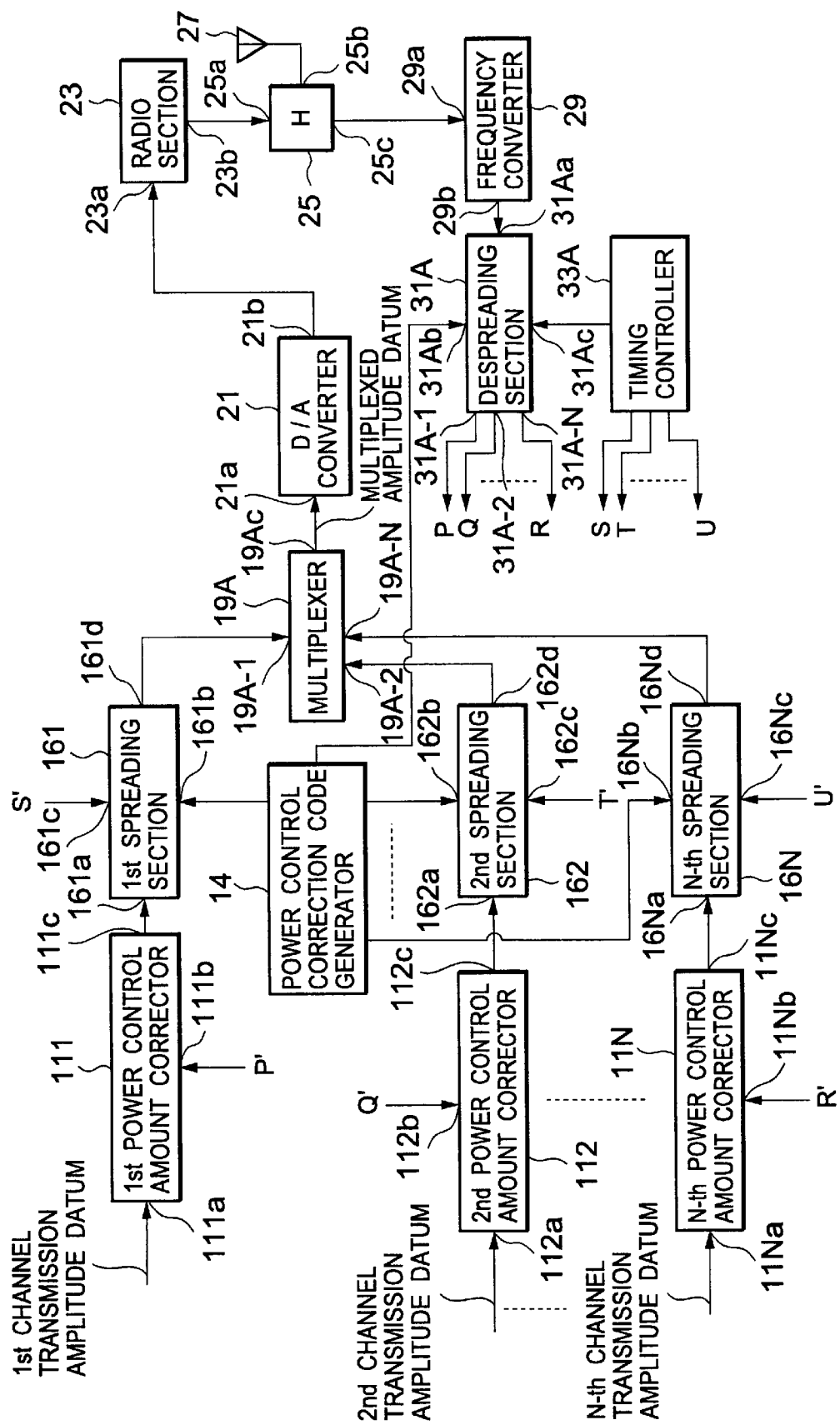
FIG. 11 is a block diagram of a transmission power control unit according to a second embodiment of this invention for use in the CDMA cellular mobile communication system illustrated in FIG. 1.

Referring to FIG. 11, description will proceed to a transmission power control unit according to a second embodiment of the present invention. The illustrated transmission power control unit is a unit included in a radio base station apparatus which carries out an N-channel multiplexing transmission for multiplexing first through Nth channels or N channels, where N represents a positive integer which is not less than three. In FIG. 11, reference symbols P, Q, R, S, T, and U are connected to reference symbols P', Q', R', S', T', and U', respectively.

As illustrated in FIG. 11, the transmission power control unit comprises first through N-th power control amount correctors 111, 112, . . . , and 11N, the power control correction code generator 14, first through N-th spreading sections 161, 162, . . . , and 16N, a multiplexer 19A, the digital-to-analog converter 21, the radio section 23, the distributor or the branching filter 25, the antenna 27, the frequency converter 29, a despreading section 31A, and a timing controller 33A.

An n-th power control amount corrector 11n has a datum input terminal 11na supplied with an n-th power-controlled transmission amplitude datum for an n-th channel and a control input terminal 11nb supplied with an n-th detected signal indicative of n-th momentary transmission power for the n-th channel from the despreading section 31A, where n represents each of 1 through N. The n-th power control amount corrector 11n carries out, on the basis of the n-th detected value, correction of an n-th power control amount for the n-th power-controlled amplitude datum to produce an n-th corrected datum from a datum output terminal 11nc thereof.

At any rate, the n-th power control amount corrector 11n acts as an adjusting arrangement for adjusting the n-th power-controlled transmission amplitude datum on the basis of the n-th detected signal.

The power control correction code generator 13 generates the power control correction code for detecting transmission power in the first through the N-th corrected data which are supplied to the first and the N-th spreading sections 161 to 16N. An n-th spreading section 16n has a datum input terminal 16na supplied with the n-th corrected datum from the n-th power control amount corrector 11n, a code input terminal 16nb supplied with the power control correction code from the power control correction code generator 14, and a control input terminal 16nc supplied with an n-th timing signal from the timing controller 31A. Responsive to the n-th timing signal, the n-th spreading section 16n carries out an n-th spreading processing on the n-th corrected data using the power control correction code. The n-th spreading processing is for realizing a code division multiple access communication. The n-th spreading section 16n produces an n-th spread datum from a datum output terminal 16nd thereof.

The first through the N-th spread data are supplied to the multiplexer 19A.

The multiplexer 19A has first through N-th datum input terminals 19A-1, 19A-2, . . . , and 19A-N supplied with the first through the N-th spread data. The multiplexer 19A carries out a multiplexing processing on the first through the N-th spread data by summing up the first through the N-th spread data. The multiplexer 19A produces a multiplexed amplitude datum from a datum output terminal 19Ac thereof. The multiplexed amplitude datum is supplied to the digital-to-analog converter 21.

The digital-to-analog converter 21 has the datum input terminal 21a supplied with the multiplexed amplitude datum from the multiplexer 19A. The digital-to-analog converter 21 converts the multiplexed amplitude datum into the analog signal indicative of the analog value which corresponds to the multiplexed amplitude datum. The digital-to-analog converter 21 produces the analog signal from the signal output terminal 21b thereof. The analog signal is supplied to the radio section 23. The radio section 23 has the signal input terminal 23a supplied with the analog signal from the digital-to-analog converter 21. The radio section 23 carries out modulation, frequency conversion, and power amplification on the analog signal. The radio section 23 produces the transmission signal from the signal output terminal 23b thereof. The transmission signal is supplied to the distributor 25. The distributor 25 has the signal input terminal 25a supplied with the transmission signal from the radio section 23. The distributor 25 distributes the transmission signal to the antenna 27 and the frequency converter 29. In other words, the distributor 25 supplies the first and the second distributed transmission signals from the first and the second signal output terminals 25b and 25c thereof to the antenna 27 and the frequency converter 29, respectively.

The frequency converter 29 has the signal input terminal 29a supplied with the second distributed transmission signal or the extracted signal from the distributor 25. The frequency converter 29 frequency converts the second distributed transmission signal or the extractred signal into the frequency-converted signal having the frequency which enables the frequency-converted signal to digitally process. The frequency-converted signal is supplied to the despreading section 31A.

The despreading section 31A has a signal input terminal 31Aa supplied with the frequency-converted signal from the frequency converter 27, a code input terminal 31Ab supplied with the power control correction code from the power control correction code generator 14, and a control input terminal 31Ac supplied with the clock signal from the timing controller 31A. In synchronism with the clock signal, the despreading section 31A carries out a despreading operation on the frequency-converted signal using the power control correction code to detect first through N-th momentary transmission power in the frequency-converted signal. The despreading section 31A produces the first through the N-th detected signals indicative of the first through the N-th momentary transmission power from first through N-th signal output terminals 31A-1, 31A-2, . . . , and 31A-N thereof, respectively. The first through the N-th detected signals are sent to the first through the N-th power control amount correctors 111 to 11N, respectively.

The timing controller 33A generates the clock signal for synchronizing the first through the N-th spreading sections 161 to 16N to supply the first through the N-th timing signals to the first through the N-th spreading sections 161 to 16N, respectively. In addition, the timing controller 33A supplies the clock signal to the despreading section 31A.

Description of operation in the transmission power control unit illustrated in FIG. 11 is omitted because the operation in the illustrated transmission power control unit is similar to that in the transmission power control unit illustrated in FIG. 2.

Although the transmission power control unit illustrated in FIG. 2 is applicable to the radio base station apparatus for multiplexing two channels, the transmission power control unit illustrated in FIG. 11 is applicable to the radio base station apparatus for multiplexing N channels. In other words, it is possible for the transmission power control unit illustrated in FIG. 11 to expand the number of the channels to N. In comparison with the transmission power control unit illustrated in FIG. 2, this expansion is realized by providing with N power control amount correctors, with N spreading sections, with N connection lines between the power control correction code generator and the N spreading sections, with N connection lines between the N spreading sections and the N power control amount correctors, and with N connection lines between the timing controller and the N spreading sections.

Inasmuch as the power control correction code for replacing the part of the spreading code for each channel has a short code length and is continuously arranged along a time axis in the second embodiment, the transmission power control unit illustrated in FIG. 11 is advantageous in that it is unnecessary to be provided with a plurality of despreading sections for obtaining momentary transmission power for respective channels even in a case of N channels.

While this invention has thus far been described in conjunction with preferred embodiments thereof, it will now be readily possible for those skilled in the art to put this invention into various other manners.

What is claimed is:

1. A method of controlling transmission power in a transmission amplitude datum, said method comprising the steps of:

spreading the transmission amplitude datum into a spread datum;

converting the spread datum into a transmission signal;

extracting a part of the transmission signal as an extracted signal; and adjusting the transmission amplitude datum on the basis of the extracted signal.

2. A method of controlling transmission power in a transmission amplitude datum, said method comprising the steps of:

spreading the transmission amplitude datum into a spread datum;

converting the spread datum into a transmission signal;

extracting a part of the transmission signal as an extracted signal;

despreading the extracted signal to obtain transmission power in the transmission amplitude datum; and adjusting the transmission amplitude datum on the basis of the obtained transmission power.

3. A method as claimed in claim 1, wherein the step of spreading is carried out using a replaced spreading code into which a part of a spreading code is replaced with a power control correction code, the step of despreading being carried out using the power control correction code.

4. A method as claimed in claim 3, wherein the power control correction code has orthogonality and a code length which is extremely shorter than that of the spreading code.

5. A method of controlling transmission power in a transmitting apparatus for transmitting first through N-th transmission amplitude data for first through N-th channels with the first through the N-th transmission amplitude data multiplexed, where N represents a positive integer which is not less than two, said method comprising the steps of:

spreading the first through the N-th transmission amplitude data into first through N-th spread data, respectively;

multiplexing the first through the N-th spread data into a multiplexed amplitude datum;

converting the multiplexed amplitude datum into a transmission signal;

extracting a part of the transmission signal as an extracted signal;

despreading the extracted signal to produce first through N-th detected signals indicative of transmission power for the first through the N-th channels, respectively; and adjusting the first through the N-th transmission amplitude data on the basis of the first through the N-th detected signals, respectively.

6. A method as claimed in claim 5, wherein the step of spreading is carried out using first through N-th replaced spreading codes into which respective parts of first through N-th spreading codes assigned with the first through the N-th channels are replaced with a power control correction code, the step of despreading being carried out using the power control correction code.

7. A method as claimed in claim 6, wherein the power control correction code has orthogonality and a code length which is extremely shorter than that of each of the first through the N-th spreading codes.

8. A method as claimed in claim 7, wherein replacement timings to the power control correction code are different from each channel.

9. A transmission power control unit for use in a transmitting apparatus for transmitting first through N-th power-controlled transmission amplitude data for first through N-th channels with the first through the N-th power-controlled transmission amplitude data multiplexed, where N represents a positive integer which is not less than two, said transmission power control unit comprising:

first through N-th power control amount correctors supplied with the first through the N-th power-controlled transmission amplitude data, respectively, said first through said N-th power control amount correctors carrying out, on the basis of first through N-th detected signals, correction of first through N-th power control amounts on the first through the N-th power-controlled transmission amplitude data to produce first through N-th corrected data, respectively;

a power control correction code generator for generating a power control correction code for detection of transmission power;

first through N-th spreading sections connected to said first through said N-th power control amount correctors, respectively, and to said power control correction code generator in common, said first through said N-th spreading sections carrying out first through N-th spread processings on the first through the N-th corrected data using first through N-th replaced spreading codes into which respective parts of first through N-th spreading codes assigned with the first through the N-th channels are replaced with the power control correction code, respectively, said first through said N-th spreading section producing first through N-th spread data;

a multiplexer, connected to said first through said N-th spreading sections, for multiplexing the first through the N-th spread data by summing up the first through the N-th spread data, said multiplexer producing a multiplexed amplitude datum;

a digital-to-analog converter, connected to said multiplexer, for converting the multiplexed amplitude datum into an analog signal having an analog value corresponding to the multiplexed amplitude datum;

a radio section, connected to said digital-to-analog converter, for carrying out modulation, frequency conversion, and power amplification on the analog signal to produce a transmission signal;

extracting means, connected to said radio section, for extracting a part from the transmission signal as an extracted signal;

a frequency converter, connected to said extracting means, for converting the extracted signal into a frequency-converted signal having a frequency which enables the frequency-converted signal to digitally process;

a despreading section connected to said frequency converter, said power control correction code generator, and said first through said N-th power control amount correctors, said despreading section carrying out a despread processing on the frequency-converted signal to detect first through N-th momentary transmission power for the first through the N-th channels, said despreading section supplying said first through said N-th power control amount correctors with the first through the N-th detected signals indicative of the first and the N-th momentary transmission power, respectively; and a timing controller, connected to said despreading section and said first through said N-th spreading sections, for generating a clock signal for synchronizing said despreading section and said first through said N-th spreading sections, said timing controller supplying said despreading section with the clock signal, said timing controller supplying said first through said N-th spreading sections with first through N-th timing signals, respectively.

10. A transmission power control unit as claimed in claim 9, wherein the power control correction code has orthogonality and has a code length which is extremely shorter than that of each of the first through the N-th spreading codes.

11. A transmission power control unit as claimed in claim 9, wherein an n-th power control amount corrector, where n represents each of 1 through N, comprises:

an n-th analog-to-digital converter, supplied with an n-th detected signal, for converting the n-th detected signal into an n-th detected datum;

an n-th buffer, connected to said n-th analog-to-digital converter and supplied with the n-th power-controlled transmission amplitude datum, for successively buffering the n-th detected datum and the n-th power-controlled transmission amplitude datum into n-th stored detected data and n-th stored power-controlled transmission amplitude data; and an n-th processing section, connected to said n-th buffer, for processing the n-th stored detected data and the n-th stored power-controlled transmission amplitude data to produce an n-th processed datum as the n-th corrected datum.

12. A transmission power control unit as claimed in claim 9, wherein an n-th spreading section, where n represents each of 1 through N, comprises:

an n-th spreading code generator for generating an n-th spreading code for an n-th channel;

an n-th switch, connected to said n-th spreading code generator, said power control correction code generator, and said timing controller, for selecting, in response to an n-th timing signal, one of the n-th spreading code and the power control correction code as an n-th selected code, said n-th switch producing the n-th selected code as an n-th replaced spreading code; and an n-th multiplier, connected to said n-th switch and an n-th power control amount corrector, for multiplying an n-th corrected datum by the n-th replaced spreading code to produce an n-th multiplied datum as an n-th spread datum.

13. A transmission power control unit as claimed in claim 12, wherein the power control correction code has orthogonality and has a code length which is extremely shorter than that of the n-th spreading code.

14. A transmission power control unit as claimed in claim 9, wherein said radio section comprises:
   a modulator, connected to said digital-to-analog converter, for modulating a carrier having an intermediate frequency by the analog signal to produce a modulated signal;
   a second frequency converter, connected to said modulator, for converts the modulated signal having the intermediate frequency into a second frequency-converted signal having a high frequency; and
   a power amplifier, connected to said second frequency converter, for power amplifying the second frequency-converted signal into a power-amplified signal, said power amplifier producing the power-amplified signal as the transmission signal.

15. A transmission power control unit as claimed in claim 9, wherein said despreading section comprises:
   a multiplier, connected to said frequency converter and said power control correction code generator, for multiplying the frequency-converted signal by the power control correction code to produce a multiplied signal; and
   a selector, connected to said multiplier and said timing controller, for selecting the multiplied signal in response to the clock signal to supplying said first through said N-th power control amount correctors with the first through the N-th detected signals, respectively.

16. A transmission power control unit as claimed in claim 9, wherein said timing controller comprises:
   a clock oscillator for oscillating the clock signal comprising a plurality of clock pulses, said clock oscillator supplying said despreading section with the clock signal; and
   a selector, connecting said clock oscillator, for selecting ones of the clock pulses in the clock signal to supply said first through said N-th spreading sections with the first through the N-th timing signals, respectively.

17. A transmission power control unit as claimed in claim 9, wherein said transmitting apparatus is a radio base station apparatus for use in a code division multiple access (CDMA) communication system.

18. A transmission power control unit as claimed in claim 9, wherein said transmitting apparatus is a mobile station apparatus for use in a code division multiple access (CDMA) communication system.

19. A method of controlling transmission power in a radio base station apparatus for use in a code division multiple access (CDMA) communication system, said method comprising the steps of:
   replacing a part of a spreading code assigned with each channel with a power control correction code having orthogonality to produce a replaced spreading code, the power control correction code having a code length which is extremely shorter than that of the spreading code;
   spreading a spectrum of a transmission datum using the replaced spreading code to produce a transmission signal;
   despreading the transmission signal using the power control correction code to measure transmission power in the transmission datum each channel; and
   carrying out, on the basis of measured transmission power, transmission power control for the transmission datum each channel.

* * * * *